US010417559B2

(12) United States Patent
Hosokawa et al.

(10) Patent No.: US 10,417,559 B2
(45) Date of Patent: Sep. 17, 2019

(54) COMMUNICATING POSTSYNAPTIC NEURON FIRES TO NEUROMORPHIC CORES

(71) Applicant: International Business Machines Corporation, Armonk, NY (US)

(72) Inventors: Kohji Hosokawa, Shiga-ken (JP); SangBum Kim, Yorktown Heights, NY (US); Chung H. Lam, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 14/746,488

(22) Filed: Jun. 22, 2015

(65) Prior Publication Data
US 2016/0371583 A1     Dec. 22, 2016

(51) Int. Cl.
*G06N 3/063*     (2006.01)
*G06N 3/04*      (2006.01)

(52) U.S. Cl.
CPC ............. *G06N 3/063* (2013.01); *G06N 3/049* (2013.01)

(58) Field of Classification Search
CPC ................................ G06N 3/063; G06N 3/049
See application file for complete search history.

(56) References Cited

U.S. PATENT DOCUMENTS

| | | | | |
|---|---|---|---|---|
| 3,749,889 A * | 7/1973 | Vaskunas | ............ | G06K 7/0166 235/474 |
| 5,004,932 A * | 4/1991 | Nejime | .................. | G06N 3/063 326/36 |
| 5,155,802 A * | 10/1992 | Mueller | .................. | G06N 3/063 706/26 |
| 5,524,175 A * | 6/1996 | Sato | ....................... | G06N 3/063 706/41 |
| 2010/0166320 A1 * | 7/2010 | Paquier | ................ | G06K 9/4623 382/209 |
| 2011/0004579 A1 | 1/2011 | Snider | ............................ | 706/25 |

(Continued)

OTHER PUBLICATIONS

Lemmon, "What is a buffering circuit?" Verified by wayback machine to 2013. [Online] Downloaded Sep. 22, 2017 https://web.archive.org/web/20130924051925/https://www3.nd.edu/~lemmon/courses/ee224/web-manual/web-manual/lab5/node6.html.*

(Continued)

*Primary Examiner* — Ben M Rifkin
(74) *Attorney, Agent, or Firm* — Ido Tuchman; Erik Johnson

(57) ABSTRACT

A system for communicating postsynaptic neuron states. The system includes a first neuromorphic core and a second neuromorphic core. The first neuromorphic core includes a first array of synaptic memory cells and postsynaptic neuron circuits. Each of the postsynaptic neuron circuits is coupled to a row of synaptic memory cells in the first array of synaptic memory cells. Each of the postsynaptic neuron circuits is configured to fire when voltage sensed from the row of synaptic memory cells exceeds a threshold. The second neuromorphic core includes a second array of synaptic memory cells. A neuron bus is configured to serially transmit indications of a postsynaptic neuron circuit fire from the first neuromorphic core to the second neuromorphic core.

20 Claims, 7 Drawing Sheets

(56) References Cited

U.S. PATENT DOCUMENTS

2012/0317063 A1 12/2012 Sim et al. .................. 706/27
2014/0180987 A1 6/2014 Arthur et al. .............. 706/25

OTHER PUBLICATIONS

ComputerHope "Double Buffering" Verified by wayback machine to 2013. [Online] Downloaded Sep. 22, 2017 https://web.archive.org/web/20130405011312/https://www.computerhope.com/jargon/d/doublebu.htm.*

The Linux Documentation Project "Serial Port Basics" Verified by wayback machine to 2013 [Online] Downloaded Sep. 22, 2017 https://web.archive.org/web/20131003012816/http://www.tldp.org/HOWTO/Serial-HOWTO-4.html.*

\* cited by examiner

COMMUNICATING POSTSYNAPTIC NEURON FIRES TO NEUROMORPHIC CORES

BACKGROUND

This invention relates generally to memory circuits, and more particularly to neuromorphic memory systems for neuromorphic applications.

The term "neuron" was coined by Heinrich Wilhelm Gottfried von Waldeyer-Hartz in 1891 to capture the discrete information processing units of the brain. The junctions between two neurons were termed "synapses" by Sir Charles Sherrington in 1897. Information flows only along one direction through a synapse, thus we talk about a "presynaptic" and a "postsynaptic" neuron. Neurons, when activated by sufficient input received via synapses, emit "spikes" that are delivered to those synapses that the neuron is presynaptic to.

It is theorized that experiences are captured as conductance of the synapses in the brain. The synaptic conductance changes with time as a function of the relative spike times of presynaptic and post-synaptic neurons. The conductance of a synapse increases if a postsynaptic neuron fires after its pre-synaptic neuron fires, and decreases in conductance if the order of the two firings is reversed. Furthermore, the change depends on the precise delay between the two events, such that the more the delay, the less the magnitude of change.

Neuromorphic systems, also referred to as artificial neural networks, are computational systems that permit electronic systems to essentially function in a manner analogous to that of biological brains. Neuromorphic systems do not generally utilize a traditional digital model of manipulating 0s and 1s. Instead, neuromorphic systems create connections between processing elements that are roughly functionally equivalent to neurons of a biological brain. Neuromorphic systems may include various electronic circuits that model biological neurons.

One postsynaptic neuron can be connected to multiple presynaptic neurons. In a circuit with thousands of neurons, connecting postsynaptic neurons to presynaptic neurons can become very complicated.

BRIEF SUMMARY

Accordingly, one example aspect of the present invention is a method for communicating postsynaptic neuron states to a neuromorphic core. The method includes storing, in a first transmit buffer, indications of a postsynaptic neuron circuit fire from postsynaptic neuron circuits in a first neuromorphic core. Each of the postsynaptic neuron circuits is coupled to a plurality of synaptic memory cells. The indications of postsynaptic neuron circuit fire identify which of the postsynaptic neuron circuits have fired. A shifting operation serially shifts the indications of postsynaptic neuron circuit fire to a neuron bus. A receiving operation receives the indications of postsynaptic neuron circuit fire from the neuron bus at a plurality of presynaptic neuron circuits in a second neuromorphic core.

Another example aspect of the present invention is a system for communicating postsynaptic neuron states. The system includes a first neuromorphic core and a second neuromorphic core. The first neuromorphic core includes a first array of synaptic memory cells and postsynaptic neuron circuits. Each of the postsynaptic neuron circuits is coupled to a row of synaptic memory cells in the first array of synaptic memory cells. Each of the postsynaptic neuron circuits is configured to fire when voltage sensed from the row of synaptic memory cells exceeds a threshold. The second neuromorphic core includes a second array of synaptic memory cells. A neuron bus is configured to serially transmit indications of a postsynaptic neuron circuit fire from the first neuromorphic core to the second neuromorphic core.

A further example aspect of the present invention is another system for communicating postsynaptic neuron states. A first neuromorphic core includes a first array of synaptic memory cells and postsynaptic neuron circuits. Each of the postsynaptic neuron circuits is coupled to a row of synaptic memory cells in the first array of synaptic memory cells. Each of the postsynaptic neuron circuits is configured to fire when voltage sensed from the row of synaptic memory cells exceeds a threshold. The system includes a plurality of second neuromorphic cores, with each of the second neuromorphic cores including a second array of synaptic memory cells. A neuron bus is configured to serially transmit indications of a postsynaptic neuron circuit fire from the first neuromorphic core to the second neuromorphic cores.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
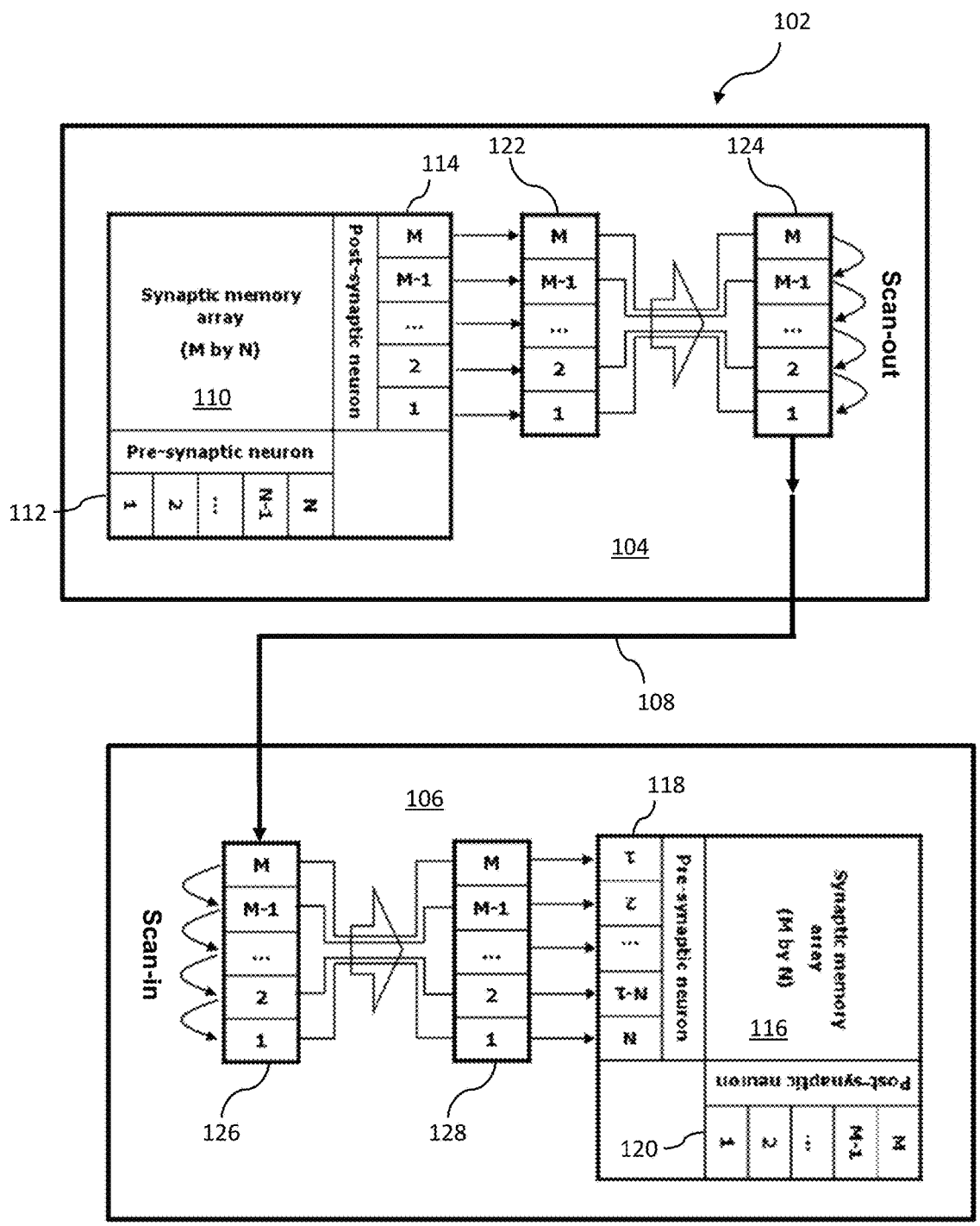
FIG. 1 shows an example embodiment of a system for communicating postsynaptic neuron states contemplated by the present invention.

The present invention is described with reference to embodiments of the invention. Throughout the description of the invention reference is made to FIGS. 1-6. When referring to the figures, like structures and elements shown throughout are indicated with like reference numerals.

Neuromorphic computing is motivated by the computational method used by the biological brains (more specifically mammal cerebral cortex) mainly comprised by neurons and synapses. Computational methods used by the biological brains are quite different from that of today's computer systems which is based on the Von Neumann architecture. Therefore, solid state devices that enable the neuromorphic applications in a power and area efficient manner require a new device concept organized in a new array structure.

Solid state non-volatile resistive memory elements can be used to emulate the function of synapses in a cerebral cortex.

The function of neurons in a cerebral cortex can be modeled by a neuron circuit. Neuron circuit blocks can be designed to program and read an array of resistive memory elements. A neuron behavior model may include a presynaptic neuron connected to a postsynaptic neuron via a synapse.

Neuron circuits can provide signals to program synaptic memory cells based on spike timing dependent plasticity (STDP) model, and can provide signals to read synaptic memory cells based on leaky integrate and fire (LIF) neuron model. The following variables can be defined for a neuron behavior model:

$V_{pre}(t)$ is a membrane potential of presynaptic neuron (as a function of time).

$V_{post}(t)$ is a membrane potential of postsynaptic neuron (as a function of time).

w is a synaptic weight. Synaptic weight is the influence that a presynaptic firing will have on postsynaptic neuron. Synaptic weights are plastic or adaptive, and change through time. Synaptic weight exhibits two forms of plasticity: (a) long-term and (b) short-term. Long-term changes in the transmission properties of synapses provide a physiological substrate for learning and memory, whereas short-term changes support a variety of computations. The mechanism of short-term plasticity is a form of gain control.

$t_1$ is a time when presynaptic neuron fires.

$t_2$ is a time when postsynaptic neuron fires.

Furthermore, the behavior model defines two functions:

Leaky integrate and fire (LIF) is a function that determines the $V_{post}$ of the cell body. When the presynaptic neuron fires, $\Delta V_{post}$ is proportional to w.

Spike timing dependent plasticity (STDP) is a function that determines w. $\Delta w$ is a function of $\Delta t$ ($t_2$-$t_1$). In other words, $\Delta w$ is a function of the timing difference between postsynaptic and presynaptic neuron firing. In one example of STDP, synapses are only strengthened if the firing of their presynaptic neuron precede, and thus could have contributed to, the firing of the post synaptic neuron. Accidental, non-causal coincidences will weaken synapses.

Embodiments of the present invention can include neuromorphic memory cells. U.S. patent application Ser. No. 14/596,223 filed Jan. 14, 2015 and titled "NEUROMORPHIC MEMORY CIRCUIT", and incorporated herein in its entirety, discloses neuromorphic memory cells. Such neuromorphic memory cells include a two transistor, one resistor (2T-1R) structure, with one transistor is used for LIF functionality and the other transistor is used for STDP functionality. By doing so, different pulse lengths can be used for LIF and STDP operations. Specifically, a first transistor is coupled to a relatively long STDP pulse and a second transistor is coupled to a relatively short LIF pulse. As discussed below, it is contemplated that other neuromorphic memory cell structures may be utilized by embodiments of the present invention.

FIG. 1 shows an example embodiment of a system 102 for communicating postsynaptic neuron states contemplated by the present invention. The system 102 includes a first neuromorphic core 104 and a second neuromorphic core 106. As discussed in detail below, a neuron bus 108 is configured to serially transmit indications of a postsynaptic neuron circuit fire from the first neuromorphic core 104 to the second neuromorphic core 106. It is contemplated that the first neuromorphic core 104 and a second neuromorphic core 106 may be located on the same integrated circuit or, alternatively, on different integrated circuits.

The first neuromorphic core 104 includes a first array of synaptic memory cells 110, presynaptic neuron circuits 112, and postsynaptic neuron circuits 114. Each of the postsynaptic neuron circuits 114 is coupled to a row of synaptic memory cells in the first array of synaptic memory cells 110. Each postsynaptic neuron circuit 114 is configured to fire when voltage sensed from the row of synaptic memory cells exceeds a threshold. U.S. patent application Ser. No. 14/722,008 filed May 26, 2015 and titled "NEURON PERIPHERAL CIRCUITS FOR NEUROMORPHIC SYNAPTIC MEMORY ARRAY BASED ON NEURON MODELS", and incorporated herein in its entirety, discloses neuron circuits that can be used to drive a synaptic memory array, and summing circuits providing a sum of signals from the postsynaptic LIF lines to a respective postsynaptic circuit of the postsynaptic circuits.

The second neuromorphic core 106 includes a second array of synaptic memory cells 116, presynaptic neuron circuits 118, and postsynaptic neuron circuits 120. The presynaptic neuron circuits 118 are configured to receive indications of postsynaptic neuron circuit fire from the neuron bus 108. The neuron bus 108 may be wired and/or wireless. Furthermore, the neuron bus 108 may be packetized over a computer network.

In one embodiment, transmission of synaptic neuron state is facilitated by a first transmit buffer 122 and a second transmit buffer 124 at the first neuromorphic core 104. The first transmit buffer 122 is coupled to the postsynaptic neuron circuits 114. Furthermore, the first transmit buffer 122 is configured to store indications of a postsynaptic neuron circuit fire from each of the postsynaptic neuron circuits 114.

As used herein, indications of postsynaptic neuron circuit fire identify which of the postsynaptic neuron circuits 114 have fired. In one embodiment, the indications of postsynaptic neuron circuit fire may be one bit, where, for example, a 1 indicates postsynaptic neuron circuit fire and a 0 indicates no postsynaptic neuron circuit fire at a corresponding postsynaptic neuron circuit 114. In other embodiments, more than one bit is used to indicate a neuron fire and/or multiple neuron fires are indicated on multi-bit words.

The second transmit buffer 124 is coupled to the first transmit buffer 122 and the neuron bus 108. The second transmit buffer 124 is configured to serially shift the indications of postsynaptic neuron circuit fire to the neuron bus 108.

In one embodiment, the neuron bus 108 is only a single neuron wide. For example if one bit is used per neuron to indicate a neuron fire, the neuron bus 108 is one bit wide. It is contemplated that the neuron bus 108 may be wider, such as in applications where more than one bit is used to indicate a neuron fire and/or multiple neuron fires are indicated on multi-bit words.

The first transmit buffer 122 is configured to update the indications of postsynaptic neuron circuit fire at the first transmit buffer 122 when one or more of the postsynaptic neuron circuits at the first neuromorphic core 104 fires. The first transmit buffer 122 is also configured to determine if the second transmit buffer 124 is in the process of serially shifting the indications of postsynaptic neuron circuit fire to the neuron bus 108. When the second transmit buffer 124 is not serially shifting the indications of postsynaptic neuron circuit fire to the neuron bus 108 and there are one or more indications of postsynaptic neuron circuit fire at the first transmit buffer 122, the first transmit buffer 122 transmits the indications of the postsynaptic neuron circuit fire from the first transmit buffer 122 to the second transmit buffer 124. The first transmit buffer 122 is also configured to clear the indications of the postsynaptic neuron circuit fire at the first transmit buffer 122 after transmitting the indications of the postsynaptic neuron circuit fire to the second transmit buffer 124.

The second neuromorphic core 106 includes a first receive buffer 126 and a second receive buffer 128. The first receive buffer 126 is coupled to the neuron bus 108 and is configured to serially shift the indications of postsynaptic neuron circuit fire from the neuron bus 108 to the second neuromorphic core 106.

The second receive buffer 128 is coupled to the first receive buffer 126. The second receive buffer 128 is configured to determine if the first receive buffer 126 is serially shifting the indications of postsynaptic neuron circuit fire from the neuron bus 108. When the first receive buffer 126 is not serially shifting the indications of postsynaptic neuron circuit fire from the neuron bus 108 and there are one or more indications of postsynaptic neuron circuit fire at the first receive buffer 126, second receive buffer 128 is configured to store the indications of the postsynaptic neuron circuit fire from the first receive buffer 126. The second receive buffer 128 is also configured to clear the indications of the postsynaptic neuron circuit fire at the first receive buffer 126 after receiving the indications of the postsynaptic neuron circuit fire.

Figure 2:
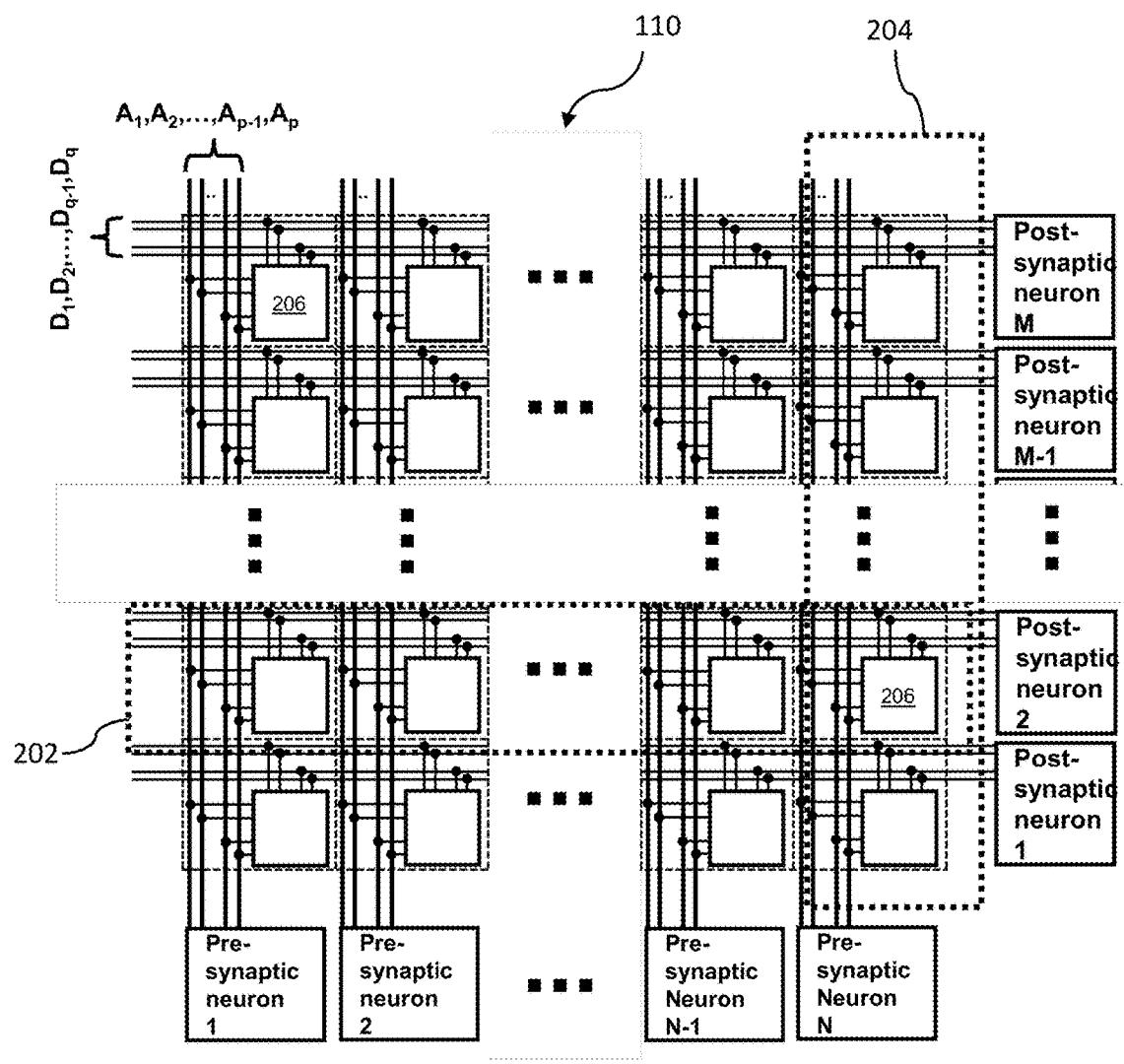
FIG. 2 shows an array of synaptic memory cells in accordance with one embodiment of the present invention.

FIG. 2 shows an array of synaptic memory cells in accordance with one embodiment of the present invention. The array of synaptic memory cells includes rows 202 and columns 204 of neuromorphic memory cells 206.

There are N×M synaptic memory cells. The memory array may, for example, include 1024×1024 memory cells. Furthermore, q postsynaptic lines are shared by synaptic memory cells on the same row and p presynaptic lines are shared by synaptic memory cell on the same column.

There are N pre-synaptic neurons. Each pre-synaptic neuron has p axon lines, A1 to Ap. There are M post-synaptic neurons. Each post-synaptic neuron has q dendrite lines, D1 to Dq. Each synaptic memory cell is connected to a post-synaptic neuron on the same row through q dendrite lines. Each synaptic memory cells is connected to a pre synaptic neuron on the same column through p dendrite lines. Each pre-synaptic neuron fires when a corresponding post-synaptic neuron fires. The corresponding post-synaptic neuron is not necessarily on the same neuromorphic synaptic memory cell array.

In one embodiment, each neuromorphic memory cell 206 includes a phase change material. In phase change memory, information is generally stored in materials that can be manipulated into different phases. Each of these phases exhibit different electrical properties which can be used for storing information. The amorphous and crystalline phases are typically two phases used for bit storage (1's and 0's) since they have detectable differences in electrical resistance. Specifically, the amorphous phase (also referred to as the reset state) has a higher resistance than the crystalline phase (also referred to as the set state).

In a particular embodiment, the phase change material is composed of $Ge_xSb_yTe_z$, where a Ge atomic concentration x is within a range from 30% to 70%, a Sb atomic concentration y is within a range from 10% to 30%, and a Te atomic concentration z is within a range from 20% to 50%. The phase change material may include an initial state with an initial electrical resistance between the set electrical resistance and the reset electrical resistance. Furthermore, the initial state is at a lower potential energy than the set state and the reset state such that the electrical resistance of the phase change material programmed to either the set state or the reset state drifts toward the initial electrical resistance over time. In other words, the set and reset states are metastable states, and the initial state is the ground state.

Figure 3:
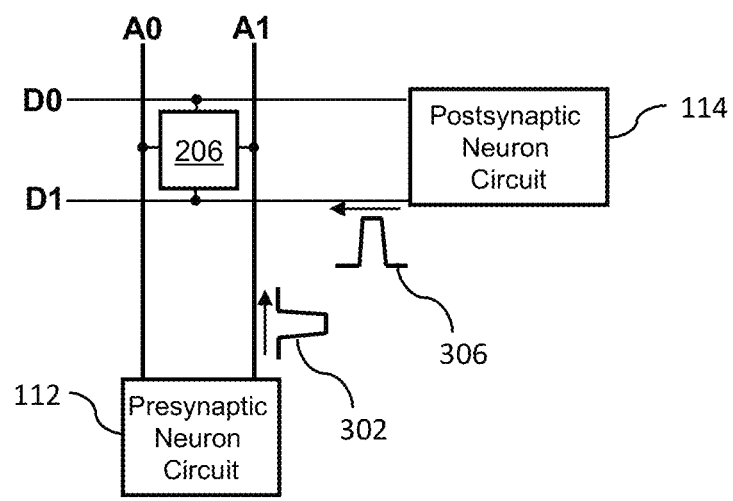
FIG. 3 shows operation of presynaptic neuron circuits and the postsynaptic neuron circuits during an STDP stage, as contemplated by one embodiment of the present invention.

FIG. 3 illustrates operation of the presynaptic neuron circuits and the postsynaptic neuron circuits during an STDP stage, as contemplated by one embodiment of the present invention. During the STDP stage, each presynaptic neuron circuit 112 starts transmitting a presynaptic STDP pulse 302 at the respective presynaptic STDP line A1 at time $t_1$. The postsynaptic neuron circuit 114 generates a postsynaptic STDP pulse 306 at time $t_2$-min($\Delta t$) on the respective postsynaptic STDP line D1 if, as discussed below, an LIF voltage V(t) is beyond the threshold voltage $V_{th}$, where min($\Delta t$) is a constant time shift.

The presynaptic STDP pulse 302 controls a current flow through a respective neuromorphic memory cell 206 when the postsynaptic STDP pulse is generated 306. The presynaptic STDP pulse 302 may be characterized by the equation $f_{VD1}^{-1}(h(t+min(\Delta t)-t_1))$, where t is time, h is a target STDP behavior function describing a desired relative change in synaptic weight of the neuromorphic memory cells based on the time difference between when the postsynaptic neuron fires ($t_2$) and the presynaptic neuron fires ($t_1$), and $f_{VD1}$ is a memory cell characteristic function describing a relationship between change in an electrical resistance of the neuromorphic memory cells 206 and a voltage of the presynaptic STDP pulse 302 at a voltage of the postsynaptic STDP pulse 306.

During the LIF stage, the presynaptic neuron circuit 112 sends out a pulse on A0 if the presynaptic neuron fires at $t_1$. The synaptic memory cell 206, which receives a signal on A0, generates a signal on D0 that is proportional to the stored weight. As discussed below, the postsynaptic neuron circuit 114 integrates signals on D0 generated by multiple synaptic memory cells 206. The postsynaptic neuron circuit 114 may integrate the leak signal on D0 along with signals generated by multiple synaptic memory cells 206. When the integrated signals crosses the threshold, the postsynaptic neuron circuit 114 fires.

Figure 4:
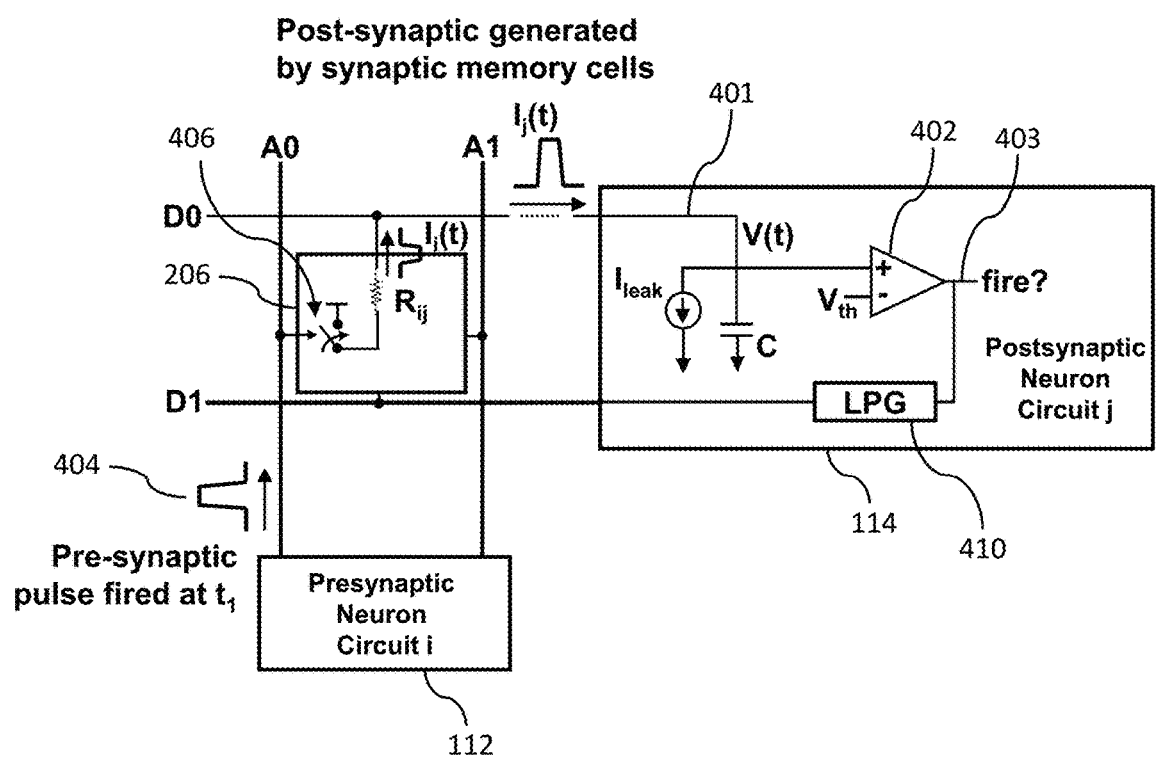
FIG. 4 illustrates an example postsynaptic neuron circuit coupled to a single memory cell, as contemplated by one embodiment of the present invention.

FIG. 4 illustrates an example postsynaptic neuron circuit 114 coupled to a single memory cell 206 for simplicity and clarity. The postsynaptic neuron circuit 114 performs three main operations: 1. integrate an LIF current at the current summing output 401 over time, 2. compare the LIF voltage V(t) to a threshold voltage $V_{th}$, and 3. generate a postsynaptic STDP pulse at the respective postsynaptic STDP line 403 if the LIF voltage V(t) is beyond the threshold voltage $V_{th}$. In one embodiment, V(t) is beyond the threshold voltage $V_{th}$ when it rises above $V_{th}$. In another embodiment, V(t) is beyond the threshold voltage $V_{th}$ when it falls below $V_{th}$.

In one embodiment, each postsynaptic neuron circuit 114 includes a LIF capacitor C electrically coupled to the current summing output 401. The LIF capacitor C is configured to integrate the LIF current over time. A LIF discharge line $I_{leak}$ coupled to the current summing output 401 is configured to slowly discharge the LIF capacitor over time. A LIF comparator 402 is electrically coupled to the current summing output 401. The LIF comparator 402 is configured to compare the LIF voltage V(t) to the threshold voltage $V_{th}$ and trigger learning pulse generator (LPG) 410 to generate the postsynaptic STDP pulse if the LIF voltage V(t) is beyond the threshold voltage $V_{th}$.

FIG. 4 also illustrates operation of the presynaptic neuron circuit 112 and postsynaptic neuron circuit 114 during an LIF stage, as contemplated by one embodiment of the present invention. The presynaptic neuron circuit 112 generates a presynaptic LIF pulse 404 on the respective presynaptic LIF line A0 at time $t_1$. The presynaptic LIF pulse 404 activates an access transistor 406 coupled to the respective presynaptic LIF line A0. The access transistor 406 enables LIF current to pass through the neuromorphic memory cell 206 to the respective postsynaptic LIF line 116.

By generating a presynaptic LIF pulse 404 on the respective presynaptic LIF line A0, the presynaptic neuron circuit 112 causes multiple synaptic memory cells 206 on presynaptic LIF line A0 to generate a signal on their own postsynaptic LIF line D0. The signal on the postsynaptic LIF lines D0 generated by each synaptic memory cell 206 is determined by the synaptic weight stored in each synaptic memory cell 206. When a postsynaptic neuron circuit 114 fires, the presynaptic neuron circuit 112 corresponding to the firing postsynaptic neuron circuit 114 generates a signal on the presynaptic STDP line A1 to program the synaptic memory cell 206 based on the STDP algorithm. The combination of the presynaptic STDP line A1 signal and the postsynaptic STDP line D1 signal determines the memory cell's programming characteristics.

Figure 5A:
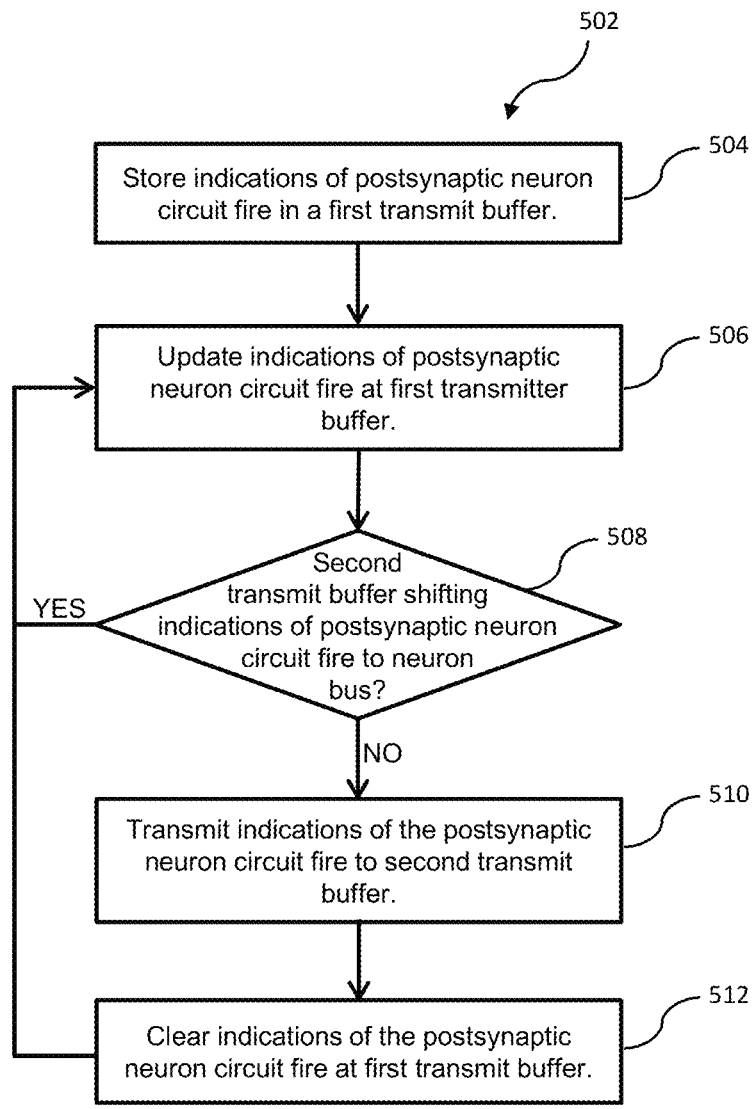
FIGS. 5A-5B show an example method for communicating postsynaptic neuron states to a neuromorphic core contemplated by the present invention.
Figure 5B:
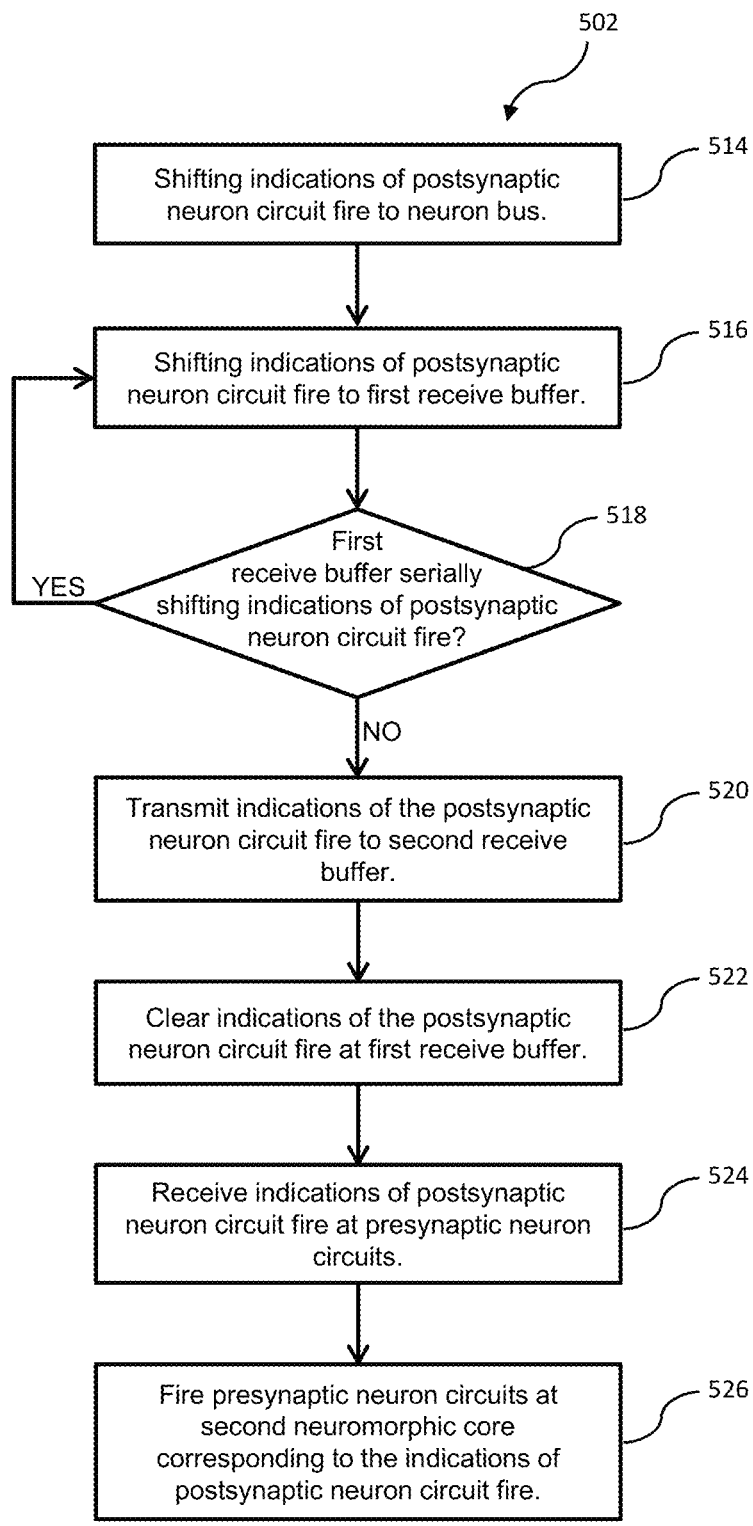

FIGS. 5A-5B show an example method 502 for communicating postsynaptic neuron states to a neuromorphic core contemplated by the present invention. The method 502 begins at storing operation 504. During this operation, indications of a postsynaptic neuron circuit fire from postsynaptic neuron circuits in a first neuromorphic core are stored in a first transmit buffer.

As discussed above, each of the postsynaptic neuron circuits is coupled to a plurality of synaptic memory cells. The indications of postsynaptic neuron circuit fire identify which of the postsynaptic neuron circuits fired. After storing operation 504, control passes to updating operation 506.

At updating operation 506, the indications of postsynaptic neuron circuit fire are updated at the first transmitter buffer when one or more of the postsynaptic neuron circuits at the first neuromorphic core fires. After updating operation 506 completes, control passes to determining operation 508.

At determining operation 508, the system determines if the second transmit buffer at the first neuromorphic core is serially shifting the indications of postsynaptic neuron circuit fire to the neuron bus. If so, control passes back to updating operation 506. If not, control passes to transmitting operation 510.

At transmitting operation 510, the first transmit buffer transmits the indications of the postsynaptic neuron circuit fire to the second transmit buffer when the second transmit buffer is not serially shifting the indications of postsynaptic neuron circuit fire to the neuron bus and there are one or more indications of postsynaptic neuron circuit fire at the first transmit buffer. After transmitting operation 510 completes, control passes to clearing operation 512.

At clearing operation 512, the indications of the postsynaptic neuron circuit fire are cleared at the first transmit buffer after transmitting the indications of the postsynaptic neuron circuit fire to the second transmit buffer. Control then returns back to updating operation 506, where the process is repeated.

FIG. 5B shows additional operations performed by the method 502 for communicating postsynaptic neuron states. At shifting operation 514, the indications of postsynaptic neuron circuit fire are serially shifted to the neuron bus by the second transmit buffer. This operation is performed by sequentially outputting each indication of postsynaptic neuron circuit fire stored on the second transmit buffer to the neuron bus. In one embodiment of the invention, the second transmit buffer includes a shift register that serially shifts indications of postsynaptic neuron circuit fire to the neuron bus. In another embodiment, the second transmit buffer includes a multiplexer to shift indications of postsynaptic neuron circuit fire to the neuron bus. After shifting operation 514, the process continues to shifting operation 516.

At shifting operation 516, the indications of the postsynaptic neuron circuit fire are serially shifted from the neuron bus to a first receive buffer at the second neuromorphic core. This operation is performed by sequentially inputting each indication of postsynaptic neuron circuit fire from the neuron bus to the first receive buffer. In one embodiment of the invention, the first receive buffer includes a shift register that serially shifts the indications of postsynaptic neuron circuit fire from the neuron bus. In another embodiment, the first receive buffer includes a demultiplexer to shift indications of postsynaptic neuron circuit fire from the neuron bus. After shifting operation 514, the process continues to determining operation 518.

At determining operation 518, the system determines if the first receive buffer at the second neuromorphic core is serially shifting the indications of postsynaptic neuron circuit fire from the neuron bus. If so, control passes back to updating operation 516. If not, control passes to transmitting operation 520.

At transmitting operation 520, the indications of the postsynaptic neuron circuit fire are transmitted from the first receive buffer to a second receive buffer at the second neuromorphic core when the first receive buffer is not serially shifting the indications of postsynaptic neuron circuit fire from the neuron bus and there are one or more indications of postsynaptic neuron circuit fire at the first receive buffer. After transmitting operation 520 completes, control passes to clearing operation 522.

At clearing operation 522, the indications of the postsynaptic neuron circuit fire are cleared at the first receive buffer after transmitting the indications of the postsynaptic neuron circuit fire to the second receive buffer. Control then passes to receiving operation 524.

At receiving operation 524, the indications of postsynaptic neuron circuit fire are received from the second receive buffer at presynaptic neuron circuits in the second neuromorphic core. After receiving operation 524 completes, control passes to firing operation 526.

At firing operation 526, presynaptic neuron circuits at the second neuromorphic core corresponding to the received indications of postsynaptic neuron circuit fire are fired after receiving the indications of postsynaptic neuron circuit fire by the first receive buffer from the neuron bus.

Figure 6:
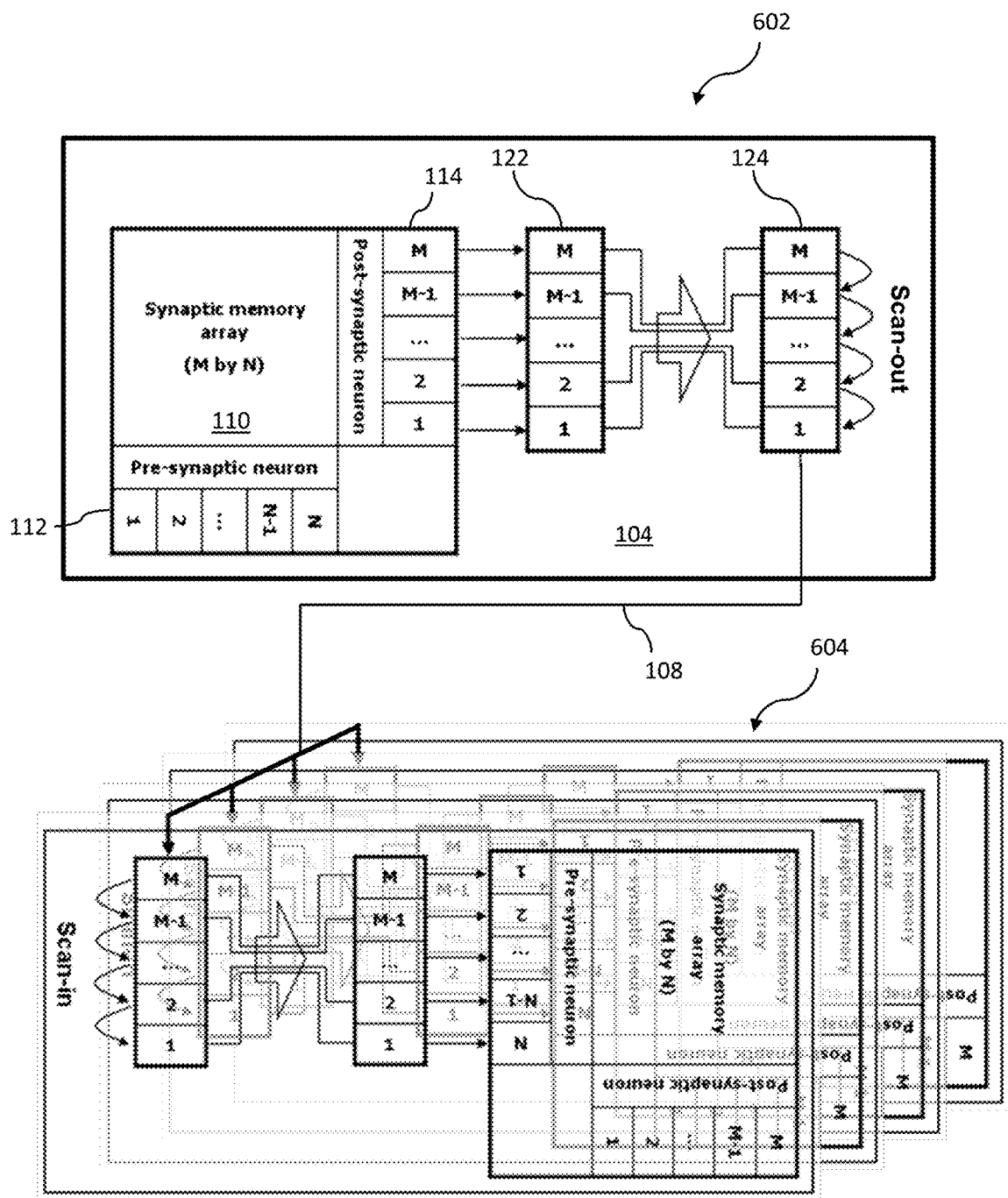
FIG. 6 shows another example system contemplated by the present invention.

FIG. 6 shows another example system 602 contemplated by the present invention. Like the configuration shown in FIG. 1, the system 602 includes a first neuromorphic core 104 coupled to a neuron bus 108. The first neuromorphic core 104 includes a first array of synaptic memory cells 110, presynaptic neuron circuits 112, and postsynaptic neuron circuits 114. As discussed above, each of the postsynaptic neuron circuits 114 is configured to fire when voltage sensed from a row of synaptic memory cells exceeds a threshold.

The first neuromorphic core 104 further includes a first transmit buffer 122 and a second transmit buffer 124. The first transmit buffer is coupled to postsynaptic neuron circuits 114 and stores indications of a postsynaptic neuron circuit fire from each of the postsynaptic neuron circuits 114. The second transmit buffer 124 is coupled to the first transmit buffer 122 and serially shifts the indications of postsynaptic neuron circuit fire to a neuron bus 108.

When a postsynaptic neuron circuit 114 fires, firing data is stored in the first transmit buffer 122. In one embodiment, the first transmit buffer 122 is an M-by-1 array. The first transmit buffer 122 has a monitor mode and a wait mode. In monitor mode, if any firing data is stored in the array, the first transmit buffer 122 sends M firing data to the second transmit buffer 124, resets all the stored firing data, and goes into wait mode. In the wait mode, the first transmit buffer 122 waits until the second transmit buffer 124 finishes scanning out M firing data to the neuron bus 108 and then goes in the monitor mode.

The second transmit buffer 124 is also an M-by-1 array. Once the second transmit buffer 124 receives M firing data from the first transmit buffer 122, it scans out M firing data one by one to the neuron bus 108.

The system includes a plurality of second neuromorphic cores 604. Each of the second neuromorphic cores including a second array of synaptic memory cells, presynaptic neuron circuits, a first receive buffer, and a second receive buffer. Each first receive buffer is configured to serially shift the indications of postsynaptic neuron circuit fire from the neuron bus to its respective second neuromorphic core.

The neuron bus 108 is configured to serially transmit indications of a postsynaptic neuron circuit fire from the first neuromorphic core to the second neuromorphic cores 604. Thus, one scan-out channel can be wired to multiple scan-in channels.

If the first receive buffer detects incoming data on the neuron bus 108, it scans in all the firing data one by one. When all M firing data are scanned in, the first receive buffer sends all the firing data to the second receive buffer. When the second receive buffer receives firing data from the first receive buffer, the second receive buffer notifies those presynaptic neuron circuits the corresponding postsynaptic neurons circuits of which fired.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for communicating postsynaptic neuron states to a neuromorphic core, the method comprising:
   storing, in a first transmit buffer, indications of a postsynaptic neuron circuit fire from postsynaptic neuron circuits in a first neuromorphic core, each of the postsynaptic neuron circuits sums output current from a plurality of synaptic memory cells over a period of time, the indications of postsynaptic neuron circuit fire identifying which of the postsynaptic neuron circuits fired;
   serially shifting the indications of postsynaptic neuron circuit fire to a neuron bus;
   receiving the indications of postsynaptic neuron circuit fire from the neuron bus at a plurality of presynaptic neuron circuits in a second neuromorphic core.

2. The method of claim 1, further comprising:
   updating the indications of postsynaptic neuron circuit fire at the first transmit buffer when one or more of the postsynaptic neuron circuits at the first neuromorphic core fires;
   determining if a second transmit buffer at the first neuromorphic core is serially shifting the indications of postsynaptic neuron circuit fire to the neuron bus;
   transmitting the indications of the postsynaptic neuron circuit fire from the first transmit buffer to the second transmit buffer when the second transmit buffer is not serially shifting the indications of postsynaptic neuron circuit fire to the neuron bus and there are one or more indications of postsynaptic neuron circuit fire at the first transmit buffer;
   clearing the indications of the postsynaptic neuron circuit fire at the first transmit buffer after transmitting the indications of the postsynaptic neuron circuit fire to the second transmit buffer.

3. The method of claim 1, further comprising serially shifting the indications of the postsynaptic neuron circuit fire from the neuron bus to a first receive buffer at the second neuromorphic core.

4. The method of claim 3, further comprising:
   determining if the first receive buffer is serially shifting the indications of postsynaptic neuron circuit fire from the neuron bus;
   transmitting the indications of the postsynaptic neuron circuit fire from the first receive buffer to a second receive buffer at the second neuromorphic core when the first receive buffer is not serially shifting the indications of postsynaptic neuron circuit fire from the neuron bus and there are one or more indications of postsynaptic neuron circuit fire at the first receive buffer; and
   clearing the indications of the postsynaptic neuron circuit fire at the first receive buffer after transmitting the indications of the postsynaptic neuron circuit fire to the second receive buffer.

5. The method of claim 3, further comprising firing one or more presynaptic neuron circuits at the second neuromorphic core after receiving the indications of postsynaptic neuron circuit fire by the first receive buffer from the neuron bus.

6. A system for communicating postsynaptic neuron states, the system comprising:
   a first neuromorphic core including a first array of synaptic: memory cells and postsynaptic neuron circuits, each of the postsynaptic neuron circuits sums output current from a row of synaptic memory cells in the first array of synaptic memory cells over a period of time, each of the postsynaptic neuron circuits is configured to fire when voltage sensed from the row of synaptic memory cells exceeds a threshold;
   a second neuromorphic core including a second array of synaptic memory cells; and
   a neuron bus configured to serially transmit indications of a postsynaptic neuron circuit fire from the first neuromorphic core to the second neuromorphic core.

7. The system of claim 6, further comprising:
   a first transmit buffer coupled to postsynaptic neuron circuits, the first transmit buffer configured to store indications of a postsynaptic neuron circuit fire from each of the postsynaptic neuron circuits, the indications of postsynaptic neuron circuit fire identifying which of the postsynaptic neuron circuits fired.

8. The system of claim 7, further comprising:
   a second transmit buffer coupled to the first transmit buffer and the neuron bus, the second transmit buffer configured to serially shift the indications of postsynaptic neuron circuit fire to the neuron bus.

9. The system of claim 8, wherein the first transmit buffer is configured to:
   update the indications of postsynaptic neuron circuit fire at the first transmit buffer when one or more of the postsynaptic neuron circuits at the first neuromorphic core fires;

determine if the second transmit buffer at the first neuromorphic core is serially shifting the indications of postsynaptic neuron circuit fire to the neuron bus;

transmit the indications of the postsynaptic neuron circuit fire from the first transmit buffer to the second transmit buffer when the second transmit buffer is not serially shifting the indications of postsynaptic neuron circuit fire to the neuron bus and there are one or more indications of postsynaptic neuron circuit fire at the first transmit buffer; and clear the indications of the postsynaptic neuron circuit fire at the first transmit buffer after transmitting the indications of the postsynaptic neuron circuit fire to the second transmit buffer.

10. The system of claim 6, further comprising:

a first receive buffer coupled to the neuron bus, the first receive buffer configured to serially shift the indications of postsynaptic neuron circuit fire from the neuron bus to the second neuromorphic core.

11. The system of claim 10, further comprising a second receive buffer coupled to the first receive buffer, the second receive buffer configured to:

determine if the first receive buffer is serially shifting the indications of postsynaptic neuron circuit fire from the neuron bus;

receive the indications of the postsynaptic neuron circuit fire from the first receive buffer to the second receive buffer at the second neuromorphic core when the first receive buffer is not serially shifting the indications of postsynaptic neuron circuit fire from the neuron bus and there are one or more indications of postsynaptic neuron circuit fire at the first receive buffer; and clear the indications of the postsynaptic neuron circuit fire at the first receive buffer after receiving the indications of the postsynaptic neuron circuit fire to the second receive buffer.

12. The system of claim 11, wherein the second neuromorphic core includes a plurality of presynaptic neuron circuits configured to receive the indications of postsynaptic neuron circuit fire from the second receive buffer.

13. The system of claim 6, wherein the second neuromorphic core includes a plurality of presynaptic neuron circuits configured to receive the indications of postsynaptic neuron circuit fire from the neuron bus.

14. A system for communicating postsynaptic neuron states, the system comprising:

a first neuromorphic core including a first array of synaptic memory cells and postsynaptic neuron circuits, each of the postsynaptic neuron circuits sums output current from a row of synaptic memory cells in the first array of synaptic memory cells over a period of time and is configured to fire when voltage sensed from the row of synaptic memory cells exceeds a threshold;

a plurality of second neuromorphic cores, each of the second neuromorphic cores including a second array of synaptic memory cells; and a neuron bus configured to serially transmit indications of a postsynaptic neuron circuit fire from the first neuromorphic core to the second neuromorphic cores.

15. The system of claim 14, further comprising:

a first transmit buffer coupled to postsynaptic neuron circuits, the first transmit buffer configured to store indications of a postsynaptic neuron circuit fire from each of the postsynaptic neuron circuits, the indications of postsynaptic neuron circuit fire identifying which of the postsynaptic neuron circuits fired.

16. The system of claim 15, further comprising:

a second transmit buffer coupled to the first transmit buffer and the neuron bus, the second transmit buffer configured to serially shift the indications of postsynaptic neuron circuit fire to the neuron bus.

17. The system of claim 16, wherein the first transmit buffer is configured to:

update the indications of postsynaptic neuron circuit fire at the first transmit buffer when one or more of the postsynaptic neuron circuits at the first neuromorphic core fires;

determine if the second transmit buffer at the first neuromorphic core is serially shifting the indications of postsynaptic neuron circuit fire to the neuron bus;

transmit the indications of the postsynaptic neuron circuit fire from the first transmit buffer to the second transmit buffer when the second transmit buffer is not serially shifting the indications of postsynaptic neuron circuit fire to the neuron bus and there are one or more indications of postsynaptic neuron circuit fire at the first transmit buffer; and clear the indications of the postsynaptic neuron circuit fire at the first transmit buffer after transmitting the indications of the postsynaptic neuron circuit fire to the second transmit buffer.

18. The system of claim 14, wherein each of the second neuromorphic cores includes a first receive buffer coupled to the neuron bus, the first receive buffer configured to serially shift the indications of postsynaptic neuron circuit fire from the neuron bus to a respective one of the second neuromorphic cores.

19. The system of claim 18, wherein each of the second neuromorphic cores includes a second receive buffer coupled to the first receive buffer, the second receive buffer configured to:

determine if the first receive buffer is serially shifting the indications of postsynaptic neuron circuit fire from the neuron bus;

receive the indications of the postsynaptic neuron circuit fire from the first receive buffer to the second receive buffer at the second neuromorphic core when the first receive buffer is not serially shifting the indications of postsynaptic neuron circuit fire from the neuron bus and there are one or more indications of postsynaptic neuron circuit fire at the first receive buffer; and clear the indications of the postsynaptic neuron circuit fire at the first receive buffer after receiving the indications of the postsynaptic neuron circuit fire to the second receive buffer.

20. The system of claim 19, wherein the each of the second neuromorphic cores includes a plurality of presynaptic neuron circuits configured to receive the indications of postsynaptic neuron circuit fire from the second receive buffer.

* * * * *